3,644,551
SINGLE STAGE CYCLODIMERIZATION OF OLEFINS
John A. Ondrey, Springdale, and Harold E. Swift, Gibsonia, Pa., assignors to Gulf Research & Development Company, Pittsburgh, Pa.
No Drawing. Filed Apr. 21, 1969, Ser. No. 818,068
Int. Cl. C07c 5/26
U.S. Cl. 260—673                                    10 Claims

ABSTRACT OF THE DISCLOSURE

A method for the single stage dimerization of olefins to aromatic compounds using a mixture of chromia-alumina and bismuth oxide. Isobutene is converted to p-xylene.

---

This invention relates to a novel process for the conversion of olefins to aromatic compounds and more particularly it relates to a novel process for converting mono-olefins containing three or four carbon atoms into the corresponding six and eight aromatic compounds, respectively.

Olefins, particularly three and four carbon mono-olefins, are a large volume by-product of various refinery operations. Since their combustion characteristics are generally undesirable, they cannot find a significant outlet in gaseous or LPG fuels. However, in view of their chemical reactivity these three and four carbon mono-olefins are generally utilized by upgrading by chemical reaction into chemical products of greater value than the starting olefins. Our process can accomplish this.

It is known that a three or four carbon mono-olefin can be converted in two stages into significant yields of aromatic compounds by dimerizing the olefin at specific conditions over a suitable catalyst in a first stage and then cyclizing the dimer, such as diisobutylene at different conditions over a different catalyst in a second stage. Unexpectedly we have discovered that these mono-olefins can be converted at excellent selectivity and good conversion to cyclic compounds in a single stage operation.

We have discovered that this single stage conversion can be accomplished by using a mixture of chromia-alumina and bismuth oxide as the catalyst. That this one-stage reaction takes place is highly surprising for a number of reasons. First, it is highly unexpected that the series of reactions taking place to convert the olefin to the cyclic dimer occur at comparable rates at the same temperature. Second it is known that hydrogen easily reduces bismuth oxide to bismuth metal and therefore it is very surprising that the hydrogen produced by the dehydrocyclizing reaction taking place has no apparent effect on the bismuth oxide. Third, chromia-alumina is known to be deactivated by water vapor, and therefore it is very surprising that the chromia-alumina is not affected by the water vapor produced in our one-stage process by the oxydehydrodimerization reaction taking place. For example, we have demonstrated in a two-stage operation using bismuth oxide in the first stage and chromia-alumina in the second stage that the chromia-alumina is substantially deactivated by the water produced in the first stage reaction of an olefin with the bismuth oxide. Yet when the bismuth oxide and chromia-alumina are mixed and the reaction is undertaken in one stage in accordance with our invention, the chromia-alumina is not significantly affected by the water vapor and the bismuth oxide is not significantly affected by the hydrogen both of which are shown to be present by analysis of the product stream.

This invention is particularly suitable for converting propylene, 1-butene, 2-butene, isobutene and mixtures of these to higher molecular weight cyclic dimers, particularly the aromatic dimers. The primary product of the propylene reaction is benzene and that of isobutene is p-xylene. 1-butene and 2-butene react very similarly producing a mixture of cyclic compounds primarily 4-vinylcyclohexene-1, styrene and xylene as the primary product. A mixture of the specified olefins other than 1-butene and 2-butene produces a relatively large mixture of compounds and for this reason is less desirable than a pure starting compound.

Also olefins represented by the formula $$CH_2=CX-CH_2R$$

in which R is hydrogen or methyl and X is halogen (fluorine, chlorine, bromine and iodine), nitrile, phenyl, isocyanate, halogen substituted methyl, halogen and alkyl substituted phenyl, etc., can be cyclodimerized by this process. The group represented by X will occur on the benzene ring of the product aromatic compound in the para position as the predominant product. For example, methacrylonitrile is converted to terephthalonitrile, 2-chloropropylene is converted to p-dichlorobenzene, 2-phenylpropylene is converted to p-diphenylbenzene and the like.

The overall, single stage conversion process of our invention probably includes the following specific, sequentially occurring and/or competitive reactions, that is dehydrogenation, oxydehydrogenation, dehydrodimerization, isomerization, oxydehydrodimerization, dehydrocyclization as well as others. Evidence indicates that there is a significant difference in the degree each specific reaction contributes to the overall reaction depending on the catalyst bed configuration, that is, whether a randomly dispersed mixture of bismuth oxide and chromia-alumina or a sequential bismuth oxide to chromia-alumina configuration is used. This is indicated in part by a marked increase in selectivity to cyclic products using the random catalyst bed compared to the sequential configuration.

An inert diluent gas such as nitrogen, methane, helium, argon, etc. can be added to the feed olefin to control the overall reaction. By adding an inert gas to the feed at otherwise constant conditions less per pass conversion of the feed olefin occurs and this tends to stabilize the bismuth oxide against reduction to the free bismuth metal. Furthermore, the addition of the inert gas has a tendency to reduce the formation of carbon oxides and decreases the dealkylation of the alkyl groups in the cyclic product. However, this increase of inert diluent tends to decrease the selectivity of the reaction to the cyclic compounds in favor of linear diolefins. The amount of inert diluent that is useful generally ranges from 0 to about 80 percent of the feed stream. It is preferred, however, not to exceed 50 percent inert diluent in the feed stream.

We have determined that a temperature of at least about 425° C. is required for a significant conversion of the mono-olefins to the cyclic dimers in our process. As the temperature is increased, the conversion increases until at about 575° C. the reaction starts to beome unselective with the formation of significant amounts of carbon oxides, coke and higher hydrocarbons. Also at the higher temperatures there is a tendency to overreduce the bismuth oxide to free bismuth metal. Above about 625° C. the reaction to undesired products becomes so significant that operation at this high temperature is undesirable. Thus we have determined that a broad operating range is about 425° to about 625° C. with a preferred range of about 525° to about 575° C. for desirable conversion with a minimum of degradation products. The preferred temperature is about 550° C. Since a temperature gradient tends to form in the catalyst bed, the operating temperature as described herein is the maximum temperature occurring in the catalyst bed.

The bismuth oxide reactant is conveniently prepared by the thermal decomposition of a suitable bismuth compound, that is a compound that thermally decomposes to bismuth oxide such as bismuth nitrate, bismuth carbonate, bismuth hydroxide, bismuth acetates, etc. The bismuth compound is formed into suitably sized particles such as 10 to 20 mesh size up to ⅜ inch pellets or larger and calcined in air. The surface area of the resulting material is generally relatively low, that is about 0.1 to about 10 square meters per gram. Other metal oxides, such as zinc oxide, magnesia, calcium oxide, titanium dioxide and the like, can be incorporated in the bismuth oxide for the purpose of aiding in its formation, reducing physical attrition and increasing the stability of the bismuth oxide towards reduction. In the reaction taking place oxygen is extracted from the crystal lattice of the bismuth oxide. This bismuth oxide is capable of losing a substantial amount of its oxygen, that is, up to about 60 percent, without damage to its lattice structure. Regeneration of the partially spent bismuth oxide can be accomplished by heating it in air and this should take place before excess oxygen is removed from the crystal lattice to prevent a collapsing of the crystal lattice structure and a coalescing of bismuth metal.

The chromia-alumina catalyst used in the process can be any chromia-alumina material, preferably of conventional manufacture and composition. For example, preformed alumina particles can be treated with a suitable solution of a chromium compound and the resulting impregnated particles pelleted, dried and calcined to produce the resulting chromia-alumina material. We find that chromia-alumina compositions containing from about five to about 50 mol percent chromia are satisfactory with the preferred chromia-alumina compositions containing from about 10 to about 22 mol percent chromia. The chromia-alumina composition may be promoted with a conventional promoter material such as potassium, sodium, silicon, etc., in an amount up to about three to five percent calculated as the oxide. It is preferred that the particle size of the chromia-alumina be similar to that of the bismuth oxide. If the particle size of either constituent is too small, an undesirably large pressure drop across the catalyst bed may result. The finished catalyst can be conveniently prepared by randomly mixing the chromia-alumina with the bismuth oxide. Also, an inert material such as silicon carbide, alpha alumina, zirconium oxide, etc., can be mixed with the catalyst to serve as a dispersant or a diluent. This inert material, when used, is preferably of a particle size similar to the other constituents.

The relative amount of chromia-alumina and bismuth oxide is a factor affecting the course of the reaction. We find that about five to about 50 weight percent chromia-alumina with the remainder bismuth oxide in the active portion of the catalyst is satisfactory with a ratio of about 10 to 30 weight percent being preferred and about 20 weight percent the most preferred composition. When the ratio of chromia-alumina goes below five weight percent, the primary products are the linear diolefins with only minor amounts of the cyclic compounds. As the amount of chromia-alumina goes above 50 weight percent, coking, cracking and polymerization become excessive. The large amount of hydrogen formed under these conditions has a tendency to reduce the bismuth oxide to free bismuth metal. Thus with a high ratio of chromia-alumina to bismuth oxide a lower reaction temperature may be desirable with an inert diluent in the feed.

We find that moderate pressures are the most desirable for the reaction. Thus we find that a pressure from about one atmosphere to about 150 p.s.i.g. is satisfactory although we prefer a pressure from about one atmosphere to about 25 p.s.i.g. The reaction can be conducted at subatmospheric pressure but there is no particular advantage in undertaking this additional expense. Above about 50 p.s.i.g. undesirable side reactions forming coke and polymer with concurrent excess reduction of the bismuth oxide to free bismuth metal tend to occur. This tendency can in part be compensated for by temperature control and use of an inert diluent, and also by operation at a lower pressure.

The space time, that is, the reciprocal of the gas hourly space velocity, is a factor in establishing the general course of the reaction. If the space time is too long, there is a tendency to form coke, polymer and crack the starting material and products. Also, at long space times the tendency to reduce bismuth oxide to free metal increases. If the space time is too short, there is a significant decrease in the conversion of the feed with a lowered selectivity to the cyclic products. For these reasons we prefer to use a gas hourly space velocity (GHSV) of about 15 to about 300 with about 30 to about 100 being more preferred, both ranges specified in terms of olefin feed and the catalytic material.

After the reaction has proceeded for such time that the bismuth oxide has lost a significant amount of its lattice oxygen but prior to damage of the lattice structure, the bismuth oxide is regenerated by reoxidizing it with a suitable oxidizing gas such as pure oxygen or air. Therefore, the reaction can be carried out in a cyclic operation with reaction in one cycle and regeneration in a second cycle. For continuous operation it is desirable to have two reactors such that a continuous stream of reacting gas flows through one of two reactors while the second one is regenerated. The cycle is periodically reversed. In order to obtain the best benefits from this invention, it is desirable to separate the unreacted olefin from the product stream and recycle it to the feed stream.

We now describe by way of specific examples the use of our invention, however, these examples are not to be construed in any manner as limiting our invention.

EXAMPLE 1

A reactor constructed at 20 mm. I.D. quartz tubing, 42 cm. in length was used for these experiments. The reactor was heated by means of a tube furnace and a six-point multicouple was placed in a 5 mm. O.D. thermowell extending the length of the catalyst zone. The catalyst was held in place by means of a quartz wool support. Silicon carbide was placed above the catalyst zone to serve as a preheat section and as a gas mixer.

A catalyst mixture made up of 14 cc. $Bi_2O_3$ (38 g.), 6 cc. chromia-alumina (5.1 g.) and 20 cc. silicon carbide was placed in the reactor. The chromia-alumina contained 19.8 percent chromia and was doped with 0.28 percent sodium. The catalyst was preheated in air for one hour at 525° C. A stream of isobutene was then passed through the reactor at 25 cc. per minute to give a gas hourly space velocity of about 75 based on the active catalyst material and about 107 based on the bismuth oxide alone. The reaction was conducted for one hour at 525° C. resulting in 17.5 percent conversion of the isobutene with 75 percent selectivity to dimerized products. These dimerized products included 79.3 weight percent p-xylene, 3.6 percent toluene, 3.0 percent benzene for a total of 85.9 percent aromatic compound. The remainder of the dimerized products were 6.2 percent 2,5-dimethyl-2,4-hexadiene, 5.8 percent 2,5-dimethyl-1,5-hexadiene and 2.1 percent diisobutylene.

EXAMPLE 2

An experiment was conducted identical with that carried out under Example 1 except that the catalyst was 20 cc.

bismuth oxide (54 g.) mixed with 20 cc. silicon carbide to give a gas hourly space velocity of 75 based on the bismuth oxide. A 22.2 percent conversion of the isobutene was obtained after one hour with a 77 percent selectivity to dimerized products. Of these dimerized products 52.9 weight percent were aromatic compounds distributed as follows: 38.0 percent p-xylene, 9.4 percent toluene and 5.5 percent benzene with the remainder of the dimer product consisting of 44.0 percent 2,5-dimethyl-1,5-hexadiene and 3.1 percent diisobutylene. The slightly higher conversion in this example results from the lower space velocity based on bismuth oxide and the higher bismuth oxide available for reaction. It is noted that there was very little 2,5-dimethyl-2,4-hexadiene present in this product indicating that isomerization is taking place in Example 1. This example illustrates the importance of the chromia-alumina in increasing the selectivity to aromatic compounds.

EXAMPLE 3

Example 1 was repeated except that the feed was 1-butene and the catalyst was made up from 12 cc. bismuth oxide, 8 cc. chromia-alumina and 20 cc. silicon carbide. One hour of operation resulted in a conversion of 20 percent and a selectivity of 80 percent to dimerized products of which about 85 percent were cyclic dimers including 4-vinylcyclohexene-1, styrene, toluene, ethyl benzene and mixed xylenes.

EXAMPLE 4

Example 3 was repeated except that the catalyst was 20 cc. bismuth oxide mixed with 20 cc. silicon carbide. After one hour the conversion of 1-butene was 25 percent with a selectivity of 72 percent to dimer products. Of these dimer products about 85 percent were noncyclic, mainly 2,6-octadiene and 3-methyl-1,5-heptadiene, and the remainder were cyclic compounds. This example illustrates the importance of chromia-alumina in increasing the selectivity to cyclic dimers.

EXAMPLE 5

A catalyst consisting of 10 cc. bismuth oxide, 5 cc. chromia-alumina and 10 cc. silicon carbide was placed in the reactor and preheated with air at 550° C. for one hour. 2-butene was then fed into the reactor with reaction taking place at 550° C. Table I sets forth the results of varying the space velocity which is based on the active constituents in the catalyst.

TABLE I

| GHSV | Conversion, percent | Selectivity to dimers, percent | Yield, dimers, percent |
| --- | --- | --- | --- |
| 40 | 20.6 | 75 | 15.5 |
| 60 | 20 | 82 | 16.4 |
| 85 | 22.8 | 87 | 19.9 |
| 110 | 20.4 | 89 | 18.2 |
| 135 | 16.4 | 90 | 14.6 |

EXAMPLE 6

Example 5 was repeated except that the reaction temperature was varied at a constant gas hourly space velocity of 60. The results are set forth in Table II.

TABLE II

| Reaction temperature, °C. | Conversion, percent | Selectivity to dimers, percent | Yield, dimers, percent |
| --- | --- | --- | --- |
| 500 | 20.5 | 91 | 18.7 |
| 550 | 20 | 82 | 16.4 |
| 575 | 25.8 | 77 | 18.6 |

It is to be noted that the dimer products in both Examples 5 and 6 were primarily cyclodimer products, mainly ethyl benzene, 4-vinylcyclohexene-1, toluene, styrene and mixed xylenes.

EXAMPLE 7

A mixture of 20 cc. of bismuth oxide (54 grams) and 20 cc. of silicon carbide was charged to the reactor. Air was passed over the catalyst at 550° C. for one hour, then nitrogen for 5 to 10 minutes. Propylene was passed over the bismuth oxide at a GHSV of 60 for one hour at 550° C. The products were analyzed by gas chromatography. After several reaction-regeneration cycles, the propylene conversion lined-out at 12 percent. The six carbon condensate contained 63 mol percent 1,5-hexadiene, 28 mol percent benzene and 9 mol percent 1,3-cyclohexadiene.

EXAMPLE 8

A mixture of 20 cc. of bismuth oxide, 9 cc. of chromia-alumina and 15 cc. of silicon carbide was charged to the reactor. Air was passed over the catalyst at 550° C. for one hour, then it was flushed with nitrogen for 5 to 10 minutes. Propylene was passed over the catalyt mixture at a GHSV of 41 (based on total catalyst) for one hour at 550° C. After several reaction-regeneration cycles, the propylene conversion lined-out at about 10 percent. The organic condensate contained 7.2 mol percent 1,5-hexadiene, 10.6 mol percent 1,3-cyclohexadiene, 72 mol percent benzene and 10.2 mol percent of what is believed to be a propylene trimer. Of the propylene converted approximately 10 percent went to carbon dioxide.

This process is very convenient and inexpensive for the conversion of low cost olefins into upgraded aromatic products. In utilizing this process on a commercial scale the olefin in the product stream is preferably separated from this product stream and is recycled to extinction, that is, 100 percent conversion of the olefin can be obtained by recycling the olefin.

It is to be understood that the above disclosure is by way of specific example and that numerous modifications and variations are available to those of ordinary skill in the art without departing from the true spirit and scope of the invention.

We claim:

1. The process which comprises cyclodimerizing a feed material selected from propylene, 1-butene, 2-butene, isobutene and one having the formula $CH_2=CX-CH_2R$ wherein R is hydrogen or methyl and X is halogen, nitrile, phenyl, isocyanate, halogen substituted methyl, halogen substituted phenyl and alkyl substituted phenyl at a temperature betweeen about 425° and about 625° C., by reaction with the oxygen of bismuth oxide and in the presence of a catalyst comprising chromia-alumina, said bismuth oxide reactant and said chromia-alumina catalyst being present as a mixture comprising particles of bismuth oxide and separate particles of chromia-alumina, the weight ratio of bismuth oxide particles to chromia-alumina particles being between about 19 to 1 and about 1 to 1, and recovering a liquid product comprising predominantly at least one aromatic compound which is the cyclized dimer of said feed material.

2. A process in accordance with claim 1 in which any untreated feed material that is present in the product stream is separated from the product stream and is recycled to the feed stream.

3. A process in accordance with claim 2 in which the chromia-alumina content is from about five to about 50 weight percent of the total amount of chromia-alumina and bismuth oxide.

4. A process in accordance with claim 3 in which the chromia-alumina content is between about 10 and about 30 weight percent.

5. A process in accordance with claim 4 in which the temperature is between about 525° C. and about 575° C.

6. A process in accordance with claim 5 in which propylene is fed to the reactor and benzene is the major product.

7. A process in accordance with claim 5 in which isobutene is fed to the reactor and p-xylene is the major product.

8. A cyclic process in accordance with claim 1 in which said feed material and an oxygen-containing gas are alternately contacted with said mixture of bismuth oxide and chromia-alumina.

9. A process in accordance with claim 8 in which the feed material is propylene.

10. A process in accordance with claim 8 in which the feed material is isobutene.

References Cited

UNITED STATES PATENTS

| | | | |
|---|---|---|---|
| 2,850,546 | 9/1958 | Pevere et al. | 260—673 |
| 2,397,301 | 3/1946 | Vesterdol | 260—673 |
| 3,374,281 | 3/1968 | Csicsery | 260—673 |
| 3,027,413 | 3/1962 | Moy et al. | 260—672 |
| 2,378,209 | 6/1945 | Fuller et al. | 260—673.5 |

FOREIGN PATENTS

| | | | |
|---|---|---|---|
| 632,128 | 12/1961 | Canada | 260—673.5 |

DELBERT E. GANTZ, Primary Examiner

J. M. NELSON, Assistant Examiner